Patented July 25, 1939

2,167,313

UNITED STATES PATENT OFFICE 2,167,313

MOLDABLE COMPOSITION AND PRODUCT

Wilhelm Röhrs, Hessenwinkel, near Berlin, Germany, assignor to Bakelite Corporation, New York, N. Y., a corporation of Delaware No Drawing. Application September 1, 1936, Serial No. 98,902. In Germany September 3, 1935

9 Claims. (Cl. 260—38)

This invention relates to moldable compositions prepared from synthetic resins, such as the phenol-aldehyde resins, and fillers and for convenience referred to in the art as phenoplastics.

Phenoplastics have become of great importance in electrical applications because of their valuable properties. As this field has developed the demand has constantly been for corresponding improvements in available insulating materials. In addition to high insulating properties, a high resistance to heat has become necessary. It is known that resistance to heat is increased by substituting mineral fillers for wood flour and other vegetable substances. The use of common mineral fillers, such as talc, gypsum, kaolin, ground shale, etc., however, cause a loss in mechanical strength. When asbestos is used the mechanical strength depends on the length of the fibers; but the longer the fibers, the greater is the difficulty of preparing moldable compositions from them. Furthermore, the dielectric loss in molded pieces containing asbestos is undesirably high even at medium frequencies. The suggestion has been made to substitute quartz powder as a filler for asbestos to overcome the disadvantages of the latter; but it has been found that quartz and similar hard mineral substances cause extensive wear and tear on the high polished steel molds on account of the hardness of a filler of this character.

The present invention is based on the amazing discovery that fluorite as a filler for synthetic resins, such as heat-hardenable resins from phenol and formaldehyde or from urea or thiourea and formaldehyde, yields moldable compositions that are superior to hitherto known compositions prepared from mineral fillers. For instance, a very good mechanical strength is obtained in the molded articles although fluorspar flour has no fibrous structure like wood flour and asbestos. Apparently the association of a fluorite filler with synthetic resins is of a more intimate character attributable to an increased wetting action of the resin, since other mineral fillers as talcum, ground shale and mica flour do not provide sufficient mechanical strength.

Furthermore articles molded from hardenable synthetic resins and fluorite filler have mirror-like surfaces, whereas those prepared with asbestos fibers are not as smooth and from the operating standpoint the molding compositions are difficult to use particularly for the reason that they are bulky, are not easily preformed and require very high molding pressures. All these disadvantages of asbestos fiber compositions are avoided when fluorite is the filler.

Again it has been found that dielectrically fluorite is a much more effective filler than asbestos and even superior to wood flour. Whereas the relatively high dielectric losses of asbestos-filled compositions have excluded their use for molded parts required not only to be heat-resistant but of high value electrically as well, moldable compositions with fluorite filler yield molded parts combining the great heat resistance adherent to molded pieces made of asbestos-filled compositions with the electrical properties of molded pieces made of low-loss compositions containing woodflour or other vegetable fillers.

Finally parts molded from a fluorite filler base are differentiated by their high resistivity to water and chemical influences. Water, for example, is neither absorbed mechanically as is the case with asbestos nor absorbed with accompanying swelling as is the case with wood flour and similar substances. Accordingly even after injury to the surface that is always rich in resin the molded parts retain their resistance and valuable electrical properties.

*Example 1.*—600 kilos of a fluorite powder (98% CaF$_2$), substantially free from silicic acid and leaving no appreciable residue on a U. S. Standard sieve No. 120, are mixed with 300 kilos of a novolak phenol-aldehyde resin, 50 kilos of hexamethylenetetramine and 50 kilos of pigment and other customary additions, giving a total of 1,000 kilos of mixture, is passed between mixing rolls or stirred in a kneading machine in the customary manner to a uniform consistency.

*Example 2.*—490 kilos of a fluorite powder substantially free from mineral hard impurities, such as quartz, and leaving no appreciable residue on a U. S. Standard sieve No. 120, and furthermore 180 kilos of wood flour and 280 kilos of a hardenable resin manufactured in a known manner from phenol and/or cresol and formaldehyde, are worked in a kneading machine and/or between mixing rolls to a uniform consistency, with or without pigment.

*Example 3.*—550 kilos of a fluorite powder substantially free from mineral hard impurities, such as quartz, and leaving no appreciable residue on a U. S. Standard sieve No. 120, and 450 kilos of a hardenable phenol formaldehyde resin prepared in a known manner, are intimately mixed in a pulverulent condition in a ball mill, thereupon melted between heated mixing rolls into sheets which are pulverized in a known manner.

On examining the mechanical strength of rods made from molding powder, according to Example 1, and having a right angle cross-section the following data are ascertained:

Impact strength_____ 6.2 cm. kg./cm.²
Flexural strength_____ 655 kg./cm.² whereas, in the case of an exactly similar molding composition containing ground shale instead of fluorite powder, the corresponding data are only 2.8 cm. kg./cm.² as impact strength and 432 kg./cm.² as flexural strength. Commercial molding compositions of this nature containing asbestos fibers as filler show an average impact strength of 5 cm. kg./cm.² and an average flexural strength of 600 kg./cm.² The foregoing figures show clearly that fluorite powder is superior to other fillers.

On examining the electric properties of test specimens from molding compositions according to Examples 2 and 3, the following data are obtained:

|  | Test specimens made from compositions according to Example 2 | | Test specimens made from molding compositions containing asbestos instead of fluorite according to Example 2 | |
| --- | --- | --- | --- | --- |
|  | C. F. | R. F. | C. F. | R. F. |
| Power factor p. c. | 8 | 3 | 25 | 6 |
| Dielectric constant | 8 | 6.4 | 14 | 7 |
| Loss factor | 0.64 | 0.2 | 3.5 | 0.4 |

|  | Test specimens made from molding compositions according to Example 3 | | Test specimens made from molding compositions containing wood flour instead of fluorite according to Example 3 | |
| --- | --- | --- | --- | --- |
|  | C. F. | R. F. | C. F. | R. F. |
| Power factor p. c. | 3 | 1 | 26 | 4.5 |
| Dielectric constant | 5 | 5 | 8 | 5.4 |
| Loss factor | 0.16 | 0.05 | 2.2 | 0.25 |
| Surface resistivity: (ohms per centimetre) | 100 million | | 0.9 million | |
| Dielectric strength: (volts per mil in short time puncture test) | 310 | | 285 | |

C. F.=60 cycles commercial frequency.
R. F.=1 million cycles radio frequency.

The moldable compositions can be varied as desired by including other fillers or modifying agents in addition to fluorite. The preparation of molded articles from the compositions containing fluorite follow the conditions suited to the type of fillers or modifying agents included.

For the purpose of manufacturing molding compositions according to my present invention the homogeneous mixtures prepared at ordinary temperature, for example in a ball mill, and consisting of fillers, resin binders, pigments and other usual additions, are passed between mixing rolls which are heated with the aid of steam to temperatures of about 80–120°. The temperature depends on the kind of resin used and on the composition of the mixture. The resin softens between the rolls, forming together with fillers and pigments a homogeneous sheet which is then rolled into a sheet of about ¼–⅓ inch of thickness. After removing the sheet from the rolls and after cooling it, the sheet is pulverized. The mixture of resin, fillers and other additions may also be placed into kneading machines where it is stirred in a known manner at temperatures of 50–60° until a homogeneous composition is obtained. After removal from the kneading machine and after cooling, said composition is disintegrated to a molding powder. One may also proceed in such a way that the bulky composition from the kneading machine is passed between heated mixing rolls and then worked up in the above described manner. The molding mixture may also be prepared in any other suitable way, for instance by mixing liquid resin with fillers or by using the resin in a dissolved state. In the latter case it is of course necessary to evaporate the solvent from the mixture obtained.

The manufacture of the molded articles from molding mixtures is carried out according to known processes. The molding mixtures are introduced into molds which are made of steel for instance, either in a preformed state as tablets or in a pulverulent condition, and are then subjected simultaneously to heat and pressure, yielding molded and hardened articles which may be removed immediately from the mold. Owing to the good heat conductivity of the molding mixtures, according to my present invention, short molding cycles are obtained thus enabling a particularly favorable utilization of the molds.

The following fillers may be used,—besides fluorite powder—, wood flour, mica, ground shale, barite, chalk, asbestos, lime, kaolin, iron oxyde, graphite, cotton and cellulose. As modifying agent there may be used for instance natural resin, softening and plasticizing agents etc. In addition to these substances, for instance dyestuffs, pigments and mold lubricants, such as stearic acid or stearates, may be used.

What I claim is:

1. A moldable composition comprising a homogeneous mixture of heat-hardenable synthetic resin and a filler consisting mainly of fluorite in powered form, the amount by weight of the fluorite being at least as great as the amount by weight of the resin, said composition when molded and the resin content thereof hardened yielding an article having thermally and electrically insulating properties and an impact strength of the order of 6 cm. kg./cm.², and being non-absorptive to water.

2. Molded article comprising a heat-hardened resin of the phenol-aldehyde type and a comminuted fluorite filler, said article having a dielectric constant of about 5 for alternating currents ranging from low to high frequencies.

3. Molded article comprising a heat-hardened resin of the phenol-aldehyde type and a comminuted fluorite filler, said article having a dielectric constant of about 5 for alternating currents ranging from low to high frequencies and a power factor of about 1 per cent at a frequency of 1,000,000 cycles.

4. A moldable composition comprising a homogeneous mixture of heat-hardenable synthetic resin and a filler consisting mainly of fluorite in powdered form, the weight ratio of the fluorite content to the resin content of the composition being from unity to as much as 2, said composition when molded and the resin content thereof hardened yielding an article having thermally and electrically insulating properties and an impact strength of the order of 6 cm. kg./cm.² and being non-absorptive to water.

5. A moldable composition consisting essentially of a homogeneous mixture of heat-hardenable phenol-aldehyde resin and a filler consisting mainly of fluorite in powdered form, the amount by weight of the fluorite being at least as great as the amount by weight of the resin, said composition when molded and the resin content thereof hardened yielding an article having thermally and electrically insulating properties and being non-absorptive to water.

6. A molded article comprising a heat-hardened synthetic resin and a filler consisting mainly of fluorite in powdered form, in homogeneous dispersion therethrough, the amount by weight of the fluorite being at least as great as the amount by weight of the resin, said molded article having thermally and electrically insulating properties and an impact strength of the order of 6 cm. kg./cm.$^2$ and being non-absorptive to water.

7. A molded article comprising a heat-hardened synthetic resin and a filler consisting mainly of fluorite in powdered form, in homogeneous dispersion therethrough, the weight ratio of the fluorite content to the resin content of the molded article being from unity to as much as 2, said molded article having thermally and electrically insulating properties and an impact strength of the order of 6 cm./kg./cm.$^2$ and being non-absorptive to water.

8. A molded article consisting essentially of a heat-hardened phenol-aldehyde resin and a filler consisting mainly of fluorite in powdered form, in homogeneous dispersion therethrough, the amount by weight of the fluorite being at least as great as the amount by weight of the resin, said molded article having thermally and electrically insulating properties and being non-absorptive to water.

9. A molded article comprising a heat-hardened synthetic resin and a filler consisting mainly of flourite in powdered form, in homogeneous dispersion therethrough, the weight ratio of the fluorite content to the resin content of the molded article being from unity to as much as 2, said molded article having thermally and electrically insulating properties, and an impact strength of the order of 6 cm. kg./cm.$^2$, and being non-absorptive to water.

WILHELM RÖHRS.